J. TAYLOR,

Assignor of one-half Interest to J. T. OUTTERSON.

Wood-Pulp Machine.

No. 8,845. Reissued Aug. 12, 1879.

Witnesses:

P. H. Dieterich.

Jno. A. Stockman

Inventor

James Taylor.

Per C. H. Watson & Co. Attorneys.

UNITED STATES PATENT OFFICE.

JAMES TAYLOR, OF LUZERNE, NEW YORK, ASSIGNOR OF ONE-HALF INTEREST TO JAMES T. OUTTERSON.

IMPROVEMENT IN WOOD-PULP MACHINES.

Specification forming part of Letters Patent No. 117,122, dated July 18, 1871; Reissue No. 8,845, dated August 12, 1879; application filed June 28, 1879.

*To all whom it may concern:*

Be it known that I, JAMES TAYLOR, of Luzerne, in the county of Warren and State of New York, have invented certain new and useful Improvements in Wood-Pulp Machines; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to several improvements in wood-pulp machines; and it consists, essentially, in a new means for preparing the wood for the grinding apparatus, and also in a grinder or picker for the purpose of reducing the wood to a paper-pulp, all as hereinafter more fully described, and pointed out in the claims.

Figure 1:
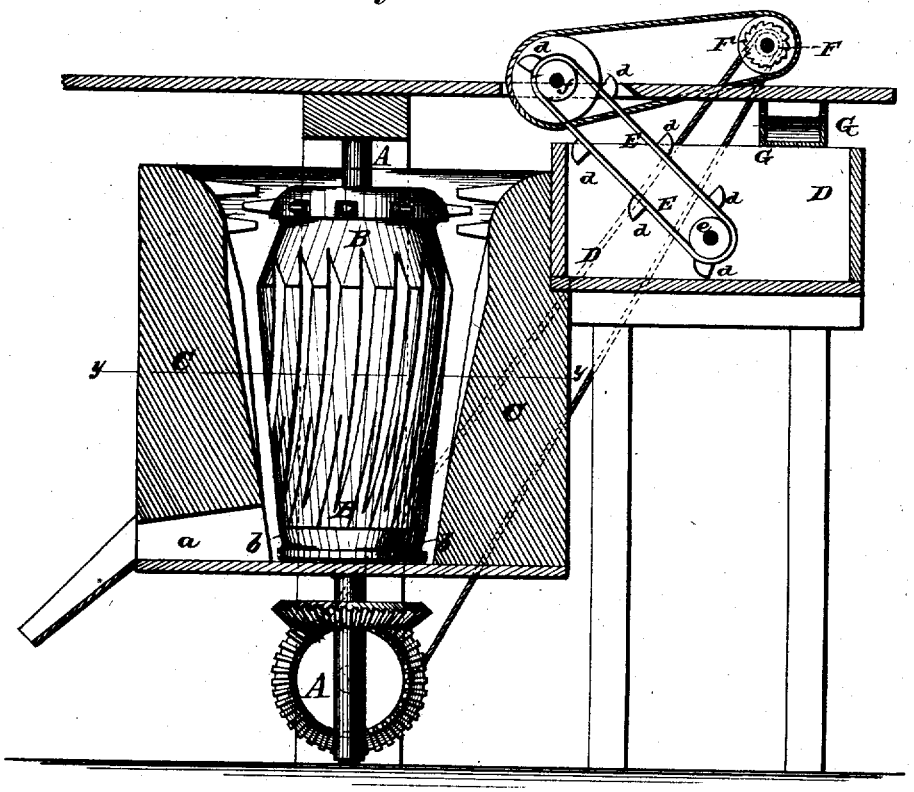
Figure 2:
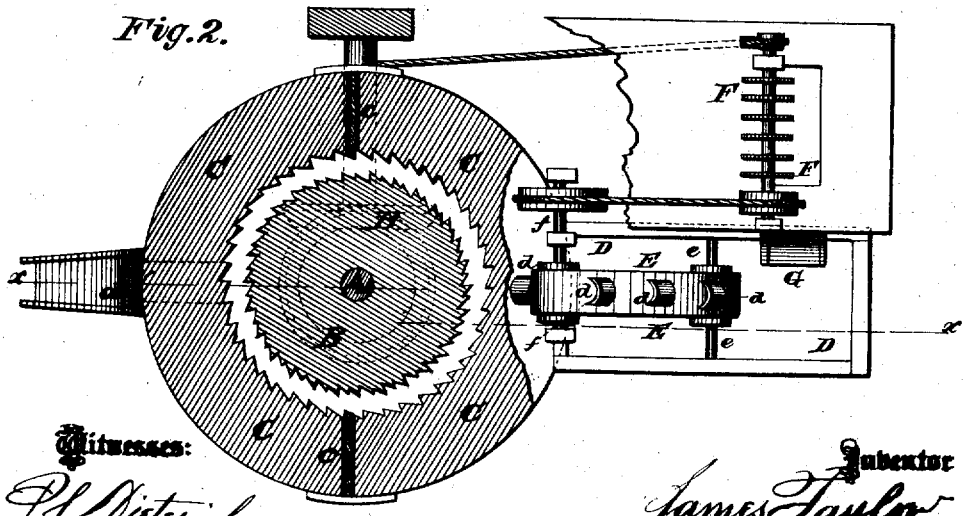

In the accompanying drawings, Figure 1 represents a vertical longitudinal section of a wood-pulp machine embodying my improvements, said section being taken on the plane of the line *x x*, Fig. 2. Fig. 2 is a horizontal section of the same, taken on the line *y y*, Fig. 1.

Similar letters of reference indicate corresponding parts.

A in the drawings represents the shaft of the grinding-mill. Upon it is mounted the grinding-core B, made of metal or stone, and of conical or other suitable shape.

C is the stationary grinding-shell surrounding the core and supported on a suitable stationary frame. The shell is also made of stone or metal, and has its inner face toothed or roughened to conform to the equally-toothed or roughened grinding face of the core. The teeth are larger and coarser at the open or receiving end of the core and shell, and become gradually smaller toward the discharge end thereof.

The wood to be ground is fed to the open or receiving end of the mill, and is first crushed by the coarse teeth, and finally ground down to the requisite degree of fineness. It is as pulp discharged from the shell through an opening, *a*, in the same, the core or shell being grooved, as at *b*, to facilitate the discharge of the pulp. The shell is made in halves of semi-conical or semi-cylindrical form.

Pieces *c c* of rubber or other elastic material are interposed between the edges of the halves. Suitable clamps, bands, or screws hold the latter together. When the grinding-surfaces are worn the halves of the shell can be brought nearer together by reducing the thickness of material at *c*.

The mill can, by making the shell in sections, be easily taken apart for re-sharpening the grinding-faces.

In the accompanying drawings I have shown a water-tank, D, sustained near the receiving end of the shell C on a suitable frame-work. An endless band, E, carrying buckets *d d*, and laid around rollers *e* and *f*, of which the former is within the latter above the tank, constitutes an elevator for feeding the wood to the mill.

In order to utilize both the tank and the elevator, wood in pieces of suitable size is thrown into the tank and fed by the elevator, together with the requisite amount of water, (when such is employed,) to the mill, where it is ground to pulp. This arrangement of tank and elevator will do the wet part of the work automatically, and will not wet and injure the attendants.

Upon a shaft which is rotated by any suitable driving mechanism I arrange a saw or saws, F, to cut large blocks of wood into small pieces, and hence prepare the same for the grinding-mill or picker.

G represents a spout through which the wood may be fed to the tank.

The wood is thus easily prepared for a mill of the described kind, and need not be applied to the grinders in large blocks.

The sawdust which is fed to the tank will be brought to the mill with the water, and hence not lost.

Motion is applied to the saw or saws and the elevator as well as to the grinders by suitable machinery.

It is evident that the position of the grinding-mill may be varied with reference to the feed without departing from the spirit of my invention, since, whether it is maintained either in a vertical or a horizontal position, the small or fine pieces of wood can be placed or fed into the same and effectively ground.

Having thus described my invention, what I claim, and desire to secure by Letters Patent, is—

1. The saw or saws F, combined with and made part of a wood-pulp machine, substantially as and for the purpose herein shown and described.

2. The grinding-shell C, made in two pieces and provided with the elastic strips *c* between the edges, substantially as and for the purpose herein shown and described.

3. In a wood-pulp machine, the conical stone or metal grinder or picker, in combination with a saw or saws, F, substantially as shown and set forth.

4. Feeding wood from a saw or saws to a grinding-machine or picker, either with or without water, as set forth.

In testimony that I claim the foregoing I have hereunto set my hand this 20th day of June, 1879.

JAMES TAYLOR.

Witnesses:
J. M. WHITMAN,
A. D. ARNOLD.